United States Patent [19]

Mock et al.

[11] Patent Number: 5,602,524
[45] Date of Patent: Feb. 11, 1997

[54] DEVICE FOR MONITORING THE AIR-PRESSURE IN PNEUMATIC TIRES FITTED ON VEHICLE WHEELS

[76] Inventors: Markus Mock, Brunnwiesenstrasse 6, CH-8610 Uster; Ernst Völlm, In Lätten 7, CH-8802 Kilchberg, both of Switzerland

[21] Appl. No.: 137,155

[22] PCT Filed: Feb. 26, 1993

[86] PCT No.: PCT/EP93/00452

§ 371 Date: Nov. 23, 1993

§ 102(e) Date: Nov. 23, 1993

[87] PCT Pub. No.: WO93/16891

PCT Pub. Date: Sep. 2, 1993

[30] Foreign Application Priority Data

Feb. 26, 1992 [DE] Germany ............... 42 05 911.9

[51] Int. Cl.$^6$ ..................................................... B60C 23/02
[52] U.S. Cl. ............... 340/447; 340/825.54; 73/146.5; 200/61.22
[58] Field of Search ..................... 340/447, 445, 340/825.54; 73/146.4, 146.5; 200/61.22

[56] References Cited

U.S. PATENT DOCUMENTS

| | | |
|---|---|---|
| 3,873,965 | 3/1975 | Garcia ........................... 340/447 |
| 4,163,208 | 7/1979 | Merz ............................. 340/447 |
| 4,237,728 | 12/1980 | Betts et al. .................... 340/447 |
| 4,319,220 | 3/1982 | Pappas et al. ................. 340/447 |
| 4,695,823 | 9/1987 | Vernon .......................... 340/447 |
| 4,734,674 | 3/1988 | Thomas et al. ................ 340/447 |
| 4,970,491 | 11/1990 | August Saint et al. ......... 340/447 |
| 4,978,941 | 12/1990 | Brown ........................... 340/447 |
| 5,001,457 | 3/1991 | Wang ............................ 340/447 |
| 5,109,213 | 4/1992 | Williams ........................ 340/447 |
| 5,218,861 | 6/1993 | Brown et al. .................. 340/445 |
| 5,228,337 | 7/1993 | Sharpe et al. ................. 340/445 |
| 5,285,189 | 2/1994 | Nowicki et al. ................ 340/447 |

FOREIGN PATENT DOCUMENTS

| | | |
|---|---|---|
| 3929316A1 | 3/1991 | Germany . |
| 3930479A1 | 3/1991 | Germany . |

*Primary Examiner*—Jeffery Hofsass
*Assistant Examiner*—Daniel J. Wu
*Attorney, Agent, or Firm*—Parmelee, Bollinger & Bramblett; George W. Rauchfuss, Jr.

[57] ABSTRACT

A device for monitoring the air pressure in pneumatic tires comprises a transmitting device fitted to each wheel of a vehicle and rotating with it, and a receiver which is built into the vehicle or accommodated in a separate housing. The transmitting device mounted in the wheel comprises a pressure gauge for measuring the tire pressure, a transmitter and a signal generator which generates an identification signal unique to each transmitter and transmitted before or after the pressure signal. The receiver processes received signals only when the identification signal received matches a reference identification signal stored in the receiver. This facilitates reliable operation of the monitoring device and prevents false alarms.

21 Claims, 5 Drawing Sheets

| PREAMBLE | IDENTIFICATION-SIGNAL | DATA | POST-AMBEL |
|---|---|---|---|
| 16 BIT | 32 BIT | 24 BIT | 4 BIT |

DEVICE FOR MONITORING THE AIR-PRESSURE IN PNEUMATIC TIRES FITTED ON VEHICLE WHEELS

FIELD OF THE INVENTION

The present invention concerns a device for monitoring the air-pressure in the air chamber of pneumatic tires of vehicle wheels.

Such monitoring devices are used, in particular, for the measurement of the air-pressure in the tires of motor vehicle wheels including lorries.

BACKGROUND OF THE INVENTION

The correct adjustment of the air-pressure of vehicle wheels is, to begin with, of an economical importance because an incorrect adjustment, that is, an air-pressure which is too high or too low, leads to an increased wear in the tire whereby the wheels of the vehicle must be replaced prematurely. This causes, in particular in the case of lorries whose tires are normally very expensive, unnecessary costs. A tire pressure which is too low also causes an increased consumption.

However, of more importance than the economical aspect is the safety aspect. A faulty air-pressure in a vehicle wheel, in particular, air-pressure which is too low, causes an increased wearing-away of the rims of the tire, whereby the temperature of the tire is greatly increased and the strength of the tire rim is reduced. Due to this, the tire can suddenly be destroyed. Because the increased wear occurs, in particular, when the speed is high, such tire damage often leads to severe traffic accidents.

In order to avoid the economical disadvantages and, in particular, the danger of accidents, the air-pressure must be regularly checked, which by lorries means daily. However, the checking does not happen often because the tire pressure measurement is a relatively lengthy and also messy task which demands as well a certain technical skill.

In the patent literature, different suggestions have therefore been made to measure the tire air-pressure by way of pressure sensors arranged on the vehicle wheels, which measurement signal is then displayed in a suitable way to the driver. Such a suggestion is to be found, for example, in DE-3930479 A1.

However, the realisation of such a monitoring device in practice hits against considerable difficulties.

Since the vehicle wheel rotates during travel and a mechanical transmission of the measurement signals from the rotating wheel onto the non-rotating parts of the vehicle is normally not possible due to lack of space, the transmission of the measurement signals must be carried out by way of a wireless transmission. Therefore, apart from infrared transmission and ultrasonic transmission, above all, electromagnetic signal transmission is offered. However, the electromagnetic signal transmission comes with problems since, in a vehicle a number of sources of electrical signals are already at hand, for example, the ignition system, the light mechanism, electrical operated blower, as well as other electrical assisted motors, etc. Apart from this, there are more than enough external sources of disturbance, for example, tramways, signal crossings, also radio senders and such like, which can influence the transmission.

Concerning the reliability of a monitoring device, high demands must be made. By a disturbance, if the monitoring device is then not in a position to reliably indicate the occurrence of a result by the monitor, then such a device cannot meet it's contemplated purpose. However, on the other hand, should the monitoring device give off constant false alarms, then the driver will not consider the result any more and the system will then remain non-effective even when monitoring events have really occurred and are indicated.

Furthermore, in view of the necessary reliability, it is also to be considered that because such a monitoring device is present, a manual test of the tire pressure does not take place any more because the drivers respectively go on the assumption that a false tire-pressure adjustment will be indicated by the monitoring device.

The known monitoring devices in the art cannot fulfil these high requirements for reliability.

Hence, the task of the present invention is to provide a monitoring device as described above, which will allow a reliable measurement and indication of the air-pressure, and respectively, the air-pressure change in the air-chamber of a pneumatic tire of a vehicle wheel.

SUMMARY OF THE INVENTION

In accordance with the invention, this task is achieved by the device according to claim 1.

Preferred embodiments of the invention are the objects of the dependent claims.

In accordance with the device of the present invention, a pressure measuring device is provided which measures the prevailing pressure in the air-chamber of the wheel and outputs a representative electrical signal in accordance therewith. Depending on the construction and arrangement of the pressure measuring device, the measurement of the pressure can be carried out as the absolute pressure, that is, without reference to the surrounding atmospheric pressure; as an overpressure in reference to the atmospheric pressure; and as a difference pressure in reference to a predetermined reference pressure.

The transmitting device is arranged on the vehicle wheel, the same as the pressure measuring device, and can be directly fixed to the valve, that is, to the inside of the tube or the tire, or can be fixed in a suitable way to the rim, for example, can be embedded.

While the pressure measuring device and the transmitting device which can and must rotate with the wheel, the receiving device is formed together with the vehicle in a stationary manner or is provided in a special transportable housing. Depending on the embodiment, each wheel of the vehicle can have it's own receiving device attached to it, but it is also possible to provide a central receiving device; a receiving device which detects the respective signals from the wheels attached to an axis; and also receiving devices, in particular, for lorries, which collect the respective signals from a group of wheels, for example, a group of wheels arranged along a side of a lorry. The components of the receiving device can be such that they are spread out in different regions or combined together.

The transmitting device comprises a control device preferrably, a programme-controlled microprocessor which controls the emission of the transmitting signals. Furthermore, the transmitting device comprises of a signal generator device which generates a characteristic identification signal for it's respective transmission device. This signal is sent out at least once before or after the sending out of the pressure signal.

The receiving device comprises a memory in which an identification-reference signal is stored, and which is related to the identification signal of the individual transmitting device. That is, the identification signal and the identification-reference signal are either identical or have a definite (mathematical) relationship to each other. A comparison device is provided in the receiving device which has the effect that a further processing of the pressure signal is only carried out if the identification signal, received by the receiving device after having been emitted from the transmission device, is identical with the identification-reference signal stored in the receiving device or has the predetermined relationship therewith.

By such an arrangement, an exceptional high reliability of the monitoring device and a great protection against disturbances of the data transmitted between the transmitting device and the receiving device, is effected.

It is improbable that a disturbance signal is created that corresponds exactly to the identification signal and can, therfore, be detected by the receiving device as a signal emitted from the individual transmitting devices. Therefore, these signals which have been coincidentally included into the emitted beam cannot lead to a false display or a false alarm of the monitoring device.

Furthermore, with such an arrangement, the detection of an overlapping of the different signals emitted from the transmitting devices as measurement values which will, therefore, be falsely interpreted, is reliably prevented.

In order to arrive at the optimal economical and operating safety of the vehicle, it is preferred that all the wheels of the vehicle are provided with a pressure measuring device and a transmitting device. In this case, there are various embodiments possible for the receiving device:

1. The receiving device tan be laid out centrally and detects then the signals from all the wheels.
2. For each wheel an almost independent receiver can be provided. However, in this case, it is preferrable that at least a common display device is provided in the dash-board or the like.
3. There could also be put together a mixed arrangement of the embodiment according to embodiments 1 and 2 with which parts of the receiving device are de-centrally arranged in the area next to the wheels and other parts are combined in a central sub-assembly. With such an arrangement, a receiver part can also be used for a number of wheels which, for example, can be arranged on an axis or on a side of the vehicle (for example, in the region of the double axis of a lorry). The receiver parts can be separated into any one of varying sub-assemblies or can be combined together. In extreme cases, the receiver parts arranged de-central to the area next to the wheels contain only one antenna.

In the case where all the wheels of a vehicle are equipped with a respective transmitting device, it is preferable that the monitoring device, having a central or part-central receiving device construction, can provide a relationship between the received transmitted signal and the respective wheel position. This is also facilitated by the identification signal.

This arrangement has clear advantages over the attempt to reduce the opposing disturbances from the individual transmitting devices on the wheels, that the transmitter only works with reduced intensity. A low transmittance intensity has namely, the disadvantage that, the receiver must be formed with a corresponding sensitivity and, therefore, will be disturbed to a great extent by foreign signals. Furthermore, with a battery operated transmitter it is difficult to keep the transmission intensity constant.

The use of the identification signal also has the advantage when different kinds of vehicles are equipped with corresponding devices.

Should a measurement be carried out in a stationary condition, that is, with the vehicle at a standstill, the distance to a neighbouring stationary vehicle can be very small, such that the receiver receives signals from both vehicles.

Through the identification signal, it will be guaranteed that only the signals from the wheels belonging to the respective vehicle will be processed.

Also in the condition when the vehicle is moving, for example, along a motorway having a number of lanes, the distance between the wheels of two vehicles can be so small that, for example, a difference in the signal based on a weakening of the intensity, leads to false interpretation.

In accordance with the invention, the monitoring device preferably comprises of a converting device which digitises the signals transmitted from the transmitter. With this embodiment, the reliability of the data transmission is further increased since insignificant changes in the signal do not influence the signals to be converted back in the receiver. The identification signal is then stored in the transmitter as a sequence of n bits whereby n is preferably 8, 16, 24, 32 or also greater. Due to a corresponding large choice of the value of n, millions of different identification signals can be defined such that the danger that, for example, two transmitters accommodated in different vehicles have the same identification signal is exceptionally low and, for example, if the identification signal also contains a characteristic of the manufacturer, then such a danger is totally excluded.

According to a preferred embodiment of the invention, the reliability of the monitoring device can be increased even more if the transmitter signal presented in digital form is coded to which additional bits are added which serve to recognise a false signal and to also correct a signal that is false. With this, the receiver can recognise a part of any possible false transmission and if need be can correct this.

In the case where a transmitter is always related to a particular receiver, which is not always possible, the emitter and the receiver can have the respective identification signal and the identification reference signal stored already by the manufacturer. It is, however, preferred that either the identification signal of the transmitter or the identification signal of the receiver is changeable. This version is normally preferred since this will allow the costs of mounting the transmitter to the wheel to be reduced.

In both cases, appropriate devices are provided so that the respective changeable identification signal cannot be changed by chance.

The signal transmission from the transmitter to the receiver can be carried out continually or non-continually.

With the continual transmission, the pressure is measured within predetermined intervals of, for example, one minute, and a corresponding signal is sent out. This method is particularly suited for when it is to be used in continual monitoring operation, that is, if the air-pressure is to be monitored during the whole journey. Attempts have shown that with this operating mode, the capacity of a small lithium battery is sufficient which delivers the energy for the transmitter for around five years.

For the non-continuous operation, there are given basically two possibilities:

With the first alternative, the tire pressure is continually monitored by a mechanical device. This can be carried out, for example, by a membrane which closes a reference chamber in comparison with the tire pressure as is described in EP-A-0417712 or in EP-A-0417704. As soon as the pressure of the tire changes by a particular amount with respect to the reference value, a switching member is activated by way of the membrane and causes transmission of the pressure signal and it's identification signal. This device has the advantage that it requires only a relatively small amount of electrical energy and can, therefore, be operated with a small battery. However, the disadvantage is that a malfunction of the transmitter by way of the receiver is possibly not recognised.

With the second alternative of non-continuous operation which, of all things, is suitable for the one-off measurement of the air-pressure before travel begins or during a travel stop, the pressure measurement and the transmission of the transmitter signal is initiated externally. Since the start signal should be transmitted with no contact as well, the transmitter must be arranged with an additional second receiver which at the same time rotates with the vehicle wheel and which receives the start signal for the pressure measurement, and so that by way of the control device the pressure measurement can be activated.

Furthermore, it is possible, in particular, with a transmitter mounted on a valve to provide a switching device in order to manually start the measurement.

BRIEF DESCRIPTION OF THE DRAWINGS

Further advantages, features and embodiments of the present invention will now be described in reference to the enclosed drawings.

In the drawings are shown.

DETAILED DESCRIPTION OF THE INVENTION

Figure 1:
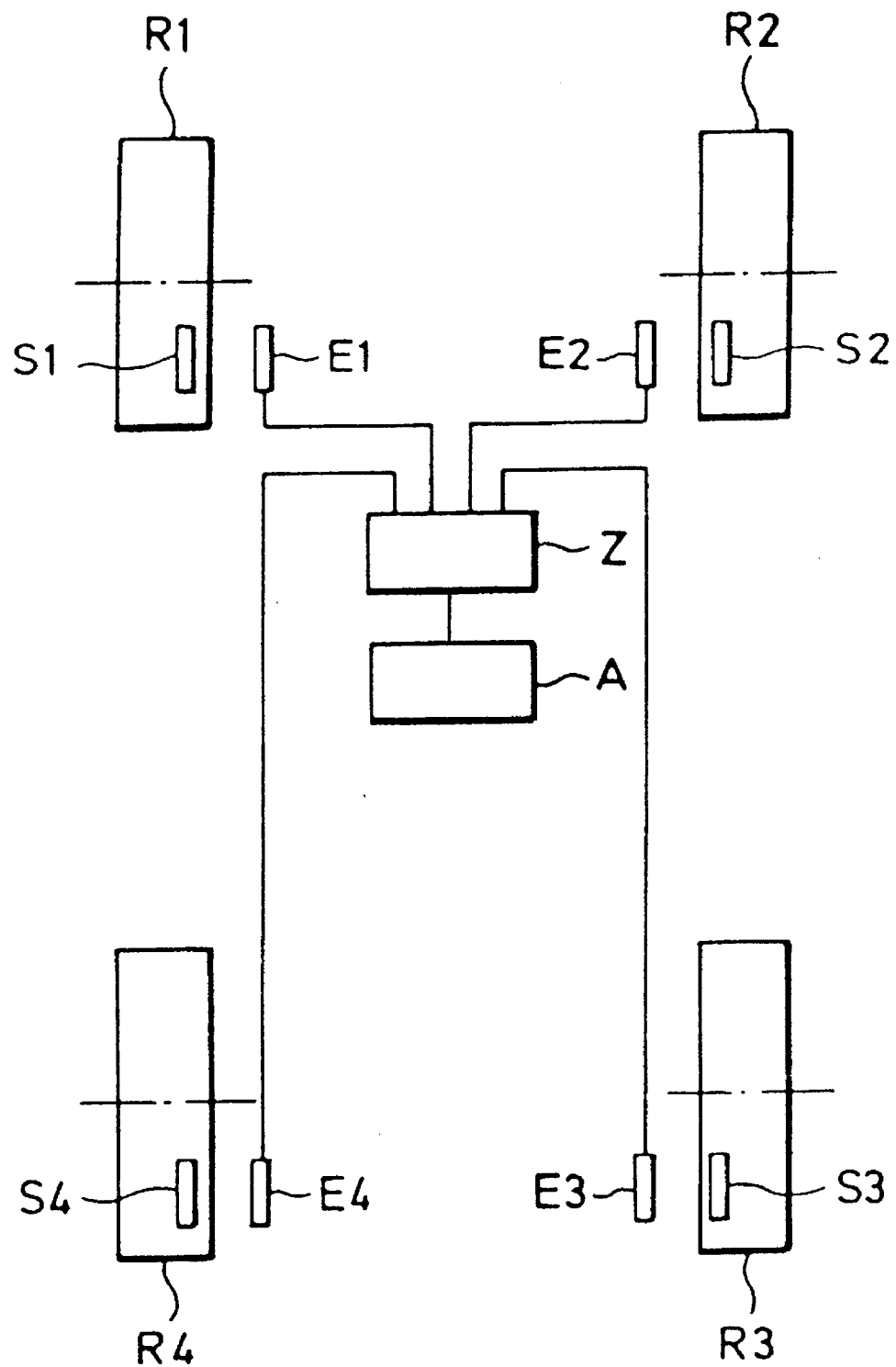
FIG. 1. A first example of an embodiment of the monitoring device of the present invention employed in a vehicle having four wheels.

A first embodiment of the invention will now be described in reference to FIGS. 1 to 5 of the drawings. This embodiment represents a motor vehicle comprising of four wheels each having an respective metal rim with a tire arranged thereon. Between the tire and the rim, a circumferential hollow space is formed which, in a so-called tubeless tire, is air-tight and therefore forms the air chamber of the wheel. In tires having a tube, an air-tight tube is inserted into this hollow space. The feeding of air into the air chamber is carried out via a valve, which in tubeless tires is directly provided on the rim and in tires having a tube, a bore is provided in the rim through which the valve is placed.

On every wheel R1 to R4 a transmitting device S1 to S4 is fixed which rotates with the respective wheel.

Further, four receiver parts E1 to E4 are provided which are fixed on the vehicle body; on the wheel suspension or the like, and which are connected via an electrical connection to a central control device Z, which on one side is connected with a display device A.

As will be made more clear in the following description in reference to FIG. 2, the transmitter devices S1 to S4 contain a pressure-gauge, a transmitter, a transmitter-controller, a memory device, etc.

In every transmitter device, a pressure sensor (18) is provided which is connected with a signal converting circuit (20) via an electrical connection which is represented here and in the following only schematically.

Whenever the absolute pressure is to be measured, which for this embodiment is the case, a piezoelectric-type sensor is preferably used as the pressure sensor which can work with a battery voltage of under 5 volts. Deviating from this arrangement, instead of measuring the absolute pressure, a pressure difference with respect to a reference pressure can also be measured and processed, which arrangement is known in the art. Further, it is also possible to arrange the pressure gauge to measure the pressure only when the pressure falls below a predetermined absolute or relative value.

Should the pressure sensor (18) directly measure the pressure difference with respect to the atmospheric pressure, then a connection must be made between the pressure gauge and the surroundings.

In accordance with this embodiment, the analogue signal of the pressure sensor is converted in the signal convertion circuit (20) to a digital signal by way of a A/D converter. The signal converting circuit (20) is further connected to a quartz controlled interval-timer (21) whose purpose is still to be explained. The digitally-converted signal is transferred to a microprocessor-computer (22) which is connected with a memory (23) which receives, as well, the signals from the interval-timer (21).

In the memory (23), which is separated into any single and, as well, varying memory areas, a programme is stored which controls the microprocessor, the programme being stored either in a continual memory or in a memory whose contents are guaranteed over a long term by the battery voltage. Furthermore, the identification signal of the transmitter is also stored in digital form in this memory (23). By means of the microprocessor the signals to be transmitted are converted into an emitter signal and led to an emitter output stage (25). This signal is transmitted from the emitter output stage (25) to an antenna (26). A battery (28) which rotates with the wheel, which preferably is a lithium battery, is provided to supply current to the emitter device.

Figures 3, 4:
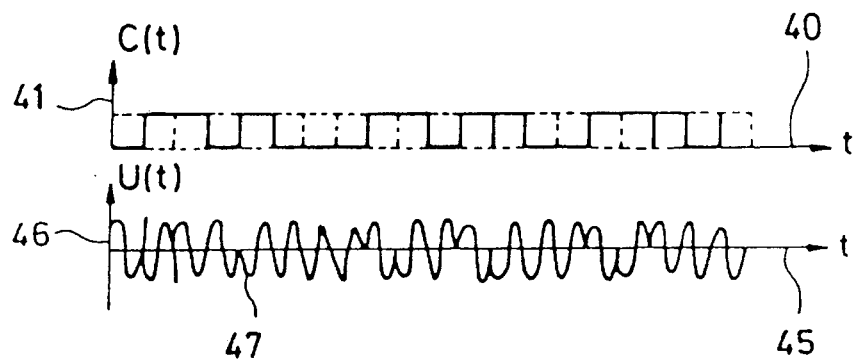
FIG. 3. A schematic representation of the signals emitted from the transmitting device according to FIG. 2.
FIG. 4. A schematic representation of the modulation of a transmitted signal.

The functioning of the transmitting device is as follows:

The transmitting device is normally to be found in the stand-by mode, in which mode only the interval-timer (21) is working in order to save on the capacity of the battery. After preset time intervals, for example, every 60 seconds, the interval-timer gives out a signal which changes the microprocessor (22) from the stand-by mode to the active mode. After activation of the microprocessor, a pressure measurement is made which is controlled by the programme in the memory (23). Finally, an emitter signal is transmitted whose composition is schematically represented in FIG. 3. The signal sequence comprises of a preamble of, for example, 16 bits, which enables the receiver to have synchronisation with the emitter signal. Then follows on the identification signal which contains an identification characteristic specific to the transmitter. The identification signal is, in this embodiment a binary number having 32 or more bits, which is stored in the memory (23) of the transmitter device. To the identification signal follows on a data block which, for example, comprises of 24 bits and contains the measured pressure value in binary form. From this follows a post-amble of, for example, 4 bits which completes the signal.

To increase the transmission safety, the signal is changed by the inclusion of check bits which allow recognition of false signals received in the receiver and correction of these false signals.

The emitter device can be so controlled that this signal sequence is sent out only once. To increase the safety, a feature which is particularly addressed by the present invention, it is, however, preferable that the signal is transmitted a plurality of times one after the other. As will be described later, it is possible with this superfluous transmission, to check in the receiver device, if a number of identical signals have been received. If this is not the case, then further processing will not take place. Due to this measure, the protection against disturbances can be suitably improved.

The signal transmission from the transmitter device to the receiver is carried out by way of an electromagnetic radio wave of constant frequency. A quartz controlled interval-timer (21) serves to control the transmitter frequency. In consideration of the quality of transmission, it is preferred to use a frequency from around 8,000 hertz or around 4,000 hertz.

This carrier signal must be modulated in a suitable way in order to transmit to the receiver device the digital information which is present.

As methods of modulation, there are considered the amplitude shift keying method (ASK), the frequency shift keying method (FSK) and phase shift keying method (PSK).

It has already been suggested to use the frequency shift keying method for transmitting the tire air pressure whereby the contents of the bit information 0 and 1 correspond to varying frequencies. With this method, however, two frequencies must be transmitted which increases the cost on the side of the transmitter and receiver.

Attempts have shown, not only from the cost but also from the quality of transmission, that it is particularly favourable to use the Phase Shift Keying (PSK) modulation method, and, in fact, in a special variant, the Differential Phase shift Keying (DPSK) is preferred.

With this method, the emitter signal experiences a phase jump whenever a 1 is conveyed; should a 0 be sent, the emitter signal remains unchanged. The phase jump is 180°.

An example of this modulation is shown in FIG. 4.

Here, in the upper part of the diagram above the time axis (40), a bit sample is shown by way of an ordinate (41) comprising of bits 0, 1, 1, 0, 1, 0, 0, 0, 1, 1, . . .

In the diagram, shown directly under, above the same scaled time axis (45) and the voltage axis (46), a voltage signal (47) is represented which comprises a frequency which stays constant, which signal is characterised in the change of phase by the above-mentioned DPSK-modulation of the bits sample.

Figure 5:
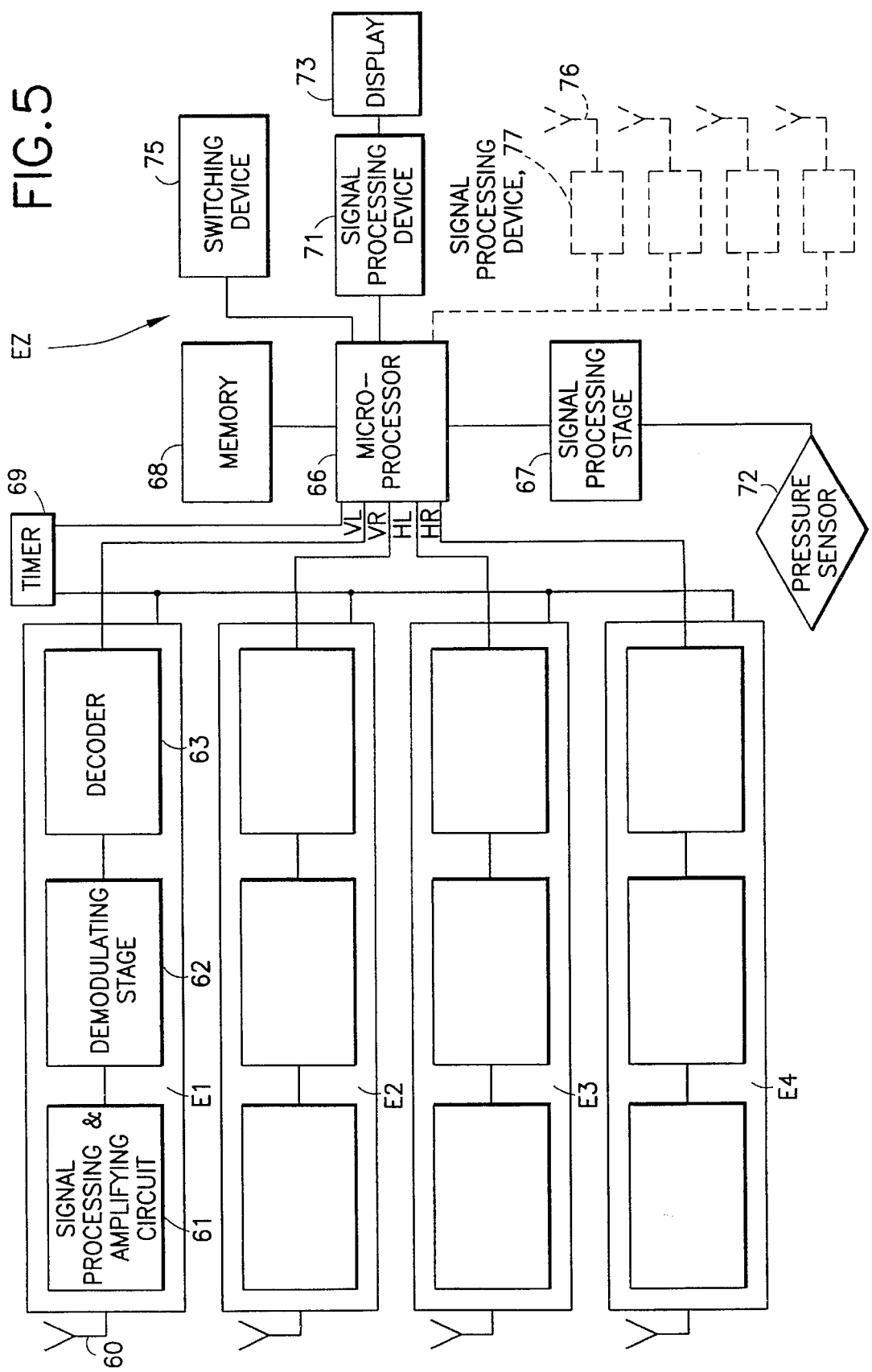
FIG. 5. A schematic block diagram of the construction of the receiving device of the embodiment according to FIG. 1.

The construction of the receiver device will now be described in reference to FIG. 5.

In this embodiment, the receiver device divides itself into a first receiver part E1 to E4, which is respectively arranged close to the wheels R1 to R4 and in a second central receiving part (EZ).

Every first receiver part E1 to E4 comprises of an antenna (60) whose signal is conveyed to a signal-processing and amplifying circuit (61) in which the signal is amplified and filtered. Then the signal is demodulated in a demodulator-stage (62) and is then available as a digital signal which corresponds to the modulated digital signal in the respective transmitting device. This signal sequence also includes the added check bits to recognise a false signal, which are checked in the decoder device (63) and taken out.

The decoding device is operated as a logic circuit and comprises a memory with changeable contents in which the identification-reference signal as well as a pairing-mode recognition signal is stored. In the decoding device (63) a comparison circuit is also included which compares the received, converted back signal with the stored identification-reference signal and the pairing-mode recognition signal. The signal processing circuit (61), the demodulating state (62) and the decoding device (63) are preferably combined as a special purpose integrated chip, that is a so called ASIC. This construction has the advantage that the signal processing and the comparison with the stored signal is carried out very quickly and does not burden the microprocessor of the central receiving device.

The demodulated and decoded digital signals are then conveyed to a central receiver part (EZ) which is connected via an electrical connection to the first receiving components E1 to E4. There the digital signals are conveyed by a microprocessor (66) which is controlled by a programme contained in the memory (68) and which also receives the data. The time control of the receiver device is carried out by an interval-timer (69).

The microprocessor is further connected with a signal processing device (71) which produces signals, which are displayed in the device formed as a display (73). The actual surrounding pressure is measured with a pressure sensor (72) and is conveyed through a signal processing stage (67) of the microprocessor (66) in case it should happen that the tire air-pressure is indicated as being overpressure, that is, as a different pressure to the atmospheric pressure.

The functioning of the receiver device now follows:

The emitted signal from the respective transmitting device is received b the antenna (60) and is digitally converted in the chip which follows, and is then conveyed to the microprocessor of the decoding device. After reciept of a signal, the comparison circuit checks if the identification signal matches the stored identification signal. If this is the case, the corresponding data value is evaluated and transmitted to the central receiving component (EZ). As explained above, the emitted signal is repeated a number of times in order to avoid false transmissions and is checked if the successive signals have the same sequence. No storage of the signals is carried out if deviations are determined between the successive signals.

From the above, it can be taken that the identification signal and the identification-reference signal are identical. The checking of the identity can be carried out such that the microprocessor subtracts one of the digital numbers from the other and determines that it is identical if the result is 0. However, it is also possible that the identification-reference signal is not in fact identical with the other signal, but are related to each other in a mathematically defined way. The identification-reference signal can be formed, for example, as a complimentary value to the comparison signal, that is, that the addition of both numbers leads to the result 0. But also other mathematical arrangements are possible, for example, a set difference between the two numbers.

In order to avoid a theoretical possible collision of the signals emitted from the different transmitting devices independent of each other, these signals are preferably controlled by means of a random circuit so that the emittance does not take place directly after the measurement of the pressure signal, but rather with a random delay within a predetermined time region, that is, for example, within 26 seconds after the measurement of the pressure signal. As such, it can be avoided that two transmitting devices which send out signals within the same time interval will over a long time collide with each other. In case a collision does occur, the decoding device cannot recognise a clear identification signal and does not evaluate the signals until the next time interval or the one after that where a clearly identifiable signal is present.

Fundamentally, in all cases in which the received signal does not clearly meet with the requirements, no storage of a measured pressure value will be carried out by the microprocessor (66) in the memory (68), but rather the last correct measured value for the respective wheel will be kept. In the case that within a predetermined time interval no identifiable signal for a wheel is recorded, then an alarm signal is given off and displayed for the wheel whose measurement function is not working.

The display of the measured pressure values in this embodiment is preferably carried out according to two modes of operation:

With the first mode of operation, the display device is acutuated by the driver via a corresponding switch on the dash board. The display device shows the pressure for all the wheels at the same time, such that the respective stored values will be refered to or the device shows the pressure values for the four wheels one after the other.

The second mode of operation is an alarm mode. With this mode of operation, there are stored in the memory of the receiving device, corresponding limit values for the pressure in every wheel whereby over-shooting these values or going under these values endangers the safety of the vehicle. As soon as one of these measurement values shoots over or under the limit values, the display (73) is automatically switched on and preferably, an accoustic signal is also given out. Because the display shows as well the wheel position and also the last measured pressure, the driver then knows which one of the wheels is not in order and can then respond accordingly.

Furthermore, it is also possible to continually indicate the tire pressure values on the display.

In this embodiment, transmitting devices are used which have a constant predetermined identification signal. There must, therefore, be provided a method to allow the identification signal of each of the transmitting devices to be stored in the first part of the receiver.

This storing action, which is also termed as pairing, must be carried out such that every random change of the stored identification signal is not considered.

For this aim, the receiver according to this embodiment comprises of a switching device (75) located at the central part of the device with which the receiving device can be switched from normal mode to pairing mode.

Because normally the central part of the receiving device is accommodated behind the dash board or in the engine compartment, it is not possible to activate this switch while travelling. Additionally, a device can also be provided which prevents the operation mode being changed into the pairing mode when the vehicle is in operation, for example, in this case it is checked if the ignition is switched on.

In the pairing mode, the decoding device (63) in the first part of the receiver and the microprocessor (66) in the central part of the receiver (EZ) check the intensity of the received signals for every receiver part E1 to E4. Every signal emitted from the transmitting device of a wheel is directed to the receiver parts E1 to E4 which produce the highest signal intensity. As such, there results in an arrangement between the position of the receiving parts E1 to E4 by way of the positioning of the respective plug connections between these receiver parts and the central device, the plug connections are identified in the demodulating stage (62) by the letters VL, VR, HL, HR. Because the vehicle in this case is at a standstill, the disturbances are very slight and, therefore, the corresponding relationship is possible for the time being.

Next to the established relationship by way of the signal intensity with the vehicle at a standstill, there is also the possibility to actively establish a relationship which has the advantage when in a modification of this embodiment a receiving device is provided for two or more wheels.

With this modification the pairing is actively established and there is then provided a switching device (75) in the central part (EZ) of the receiver, with this not only is the receiver switched to the pairing mode, but as well there is also provided in the switching device a switch for every wheel position which are respectively manually activated when the identification signal of the wheel is to be recorded for the related wheel position.

As soon as the central part (EZ) of the receiver is changed over to the pairing mode and a wheel position is chosen, a pressure change manually takes place on each respective wheel, for example, a pressure reduction caused by the wheel valve being open for a short time or an increase in the tire pressure due to pumping. The receiver checks which of the identification signals meets with this pressure change and then stores the corresponding identification signal for the chosen wheel position. This way of pairing is very safe, but requires a considerable amount of time. However, it is to be realised that a new pairing must only take place after a wheel change. The amount of time required can be reduced whereby in this embodiment instead of the presently known 60 seconds time interval between the emittance of the signals, a shorter time of emittance, for example, every 30 seconds, is established.

Figure 2:
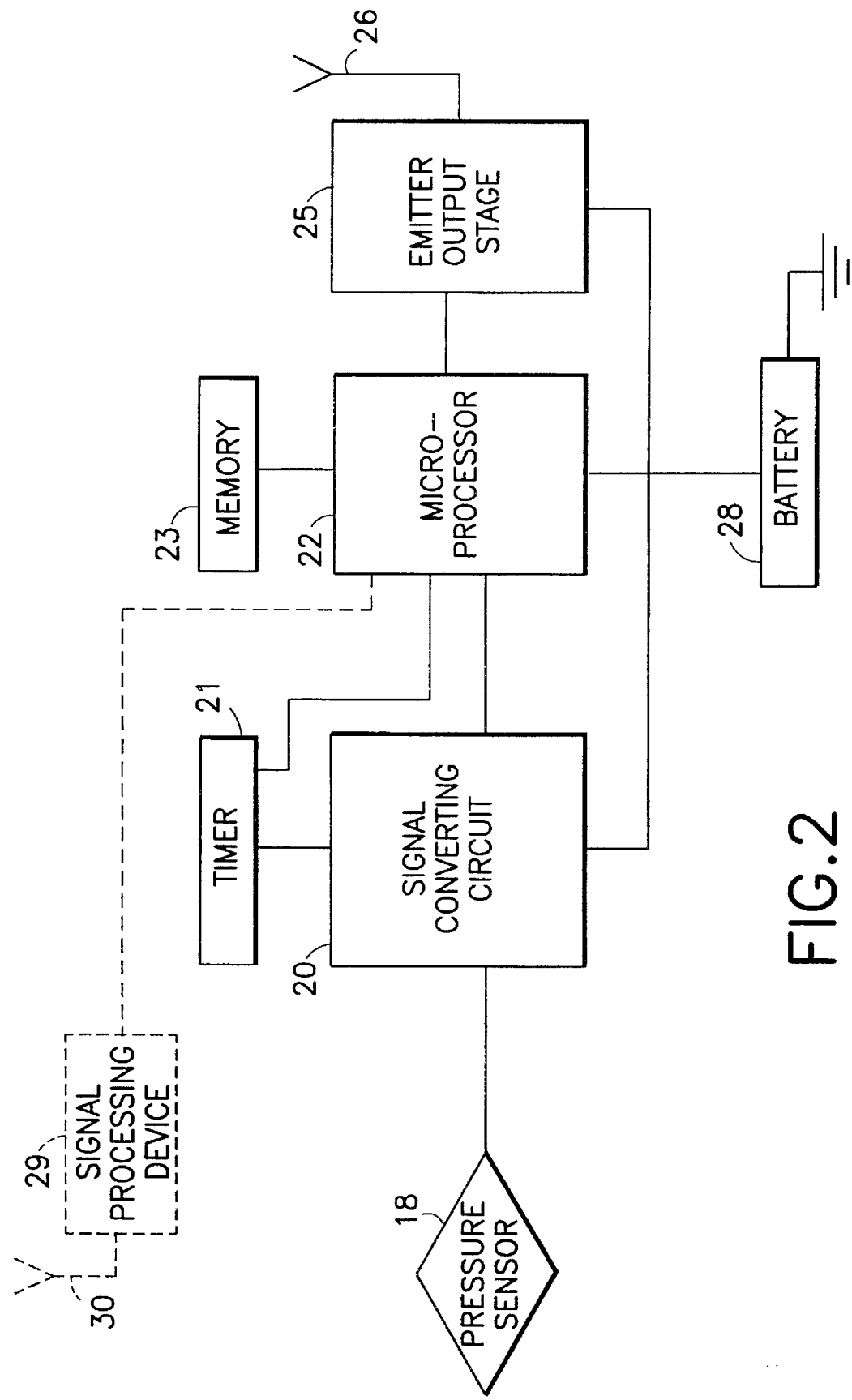
FIG. 2. A schematic block diagram of the construction of the transmitting apparatus used in the embodiment according to FIG. 1.

As an alternative to the embodiment in accordance with FIGS. 1 to 5, every transmitting device comprises of an additional signal processing circuit (29) and a second antenna (30) which is formed as a receiver antenna (these parts are shown as a dashed line in FIG. 2). Receiver antenna (30) and emitting antenna (26) can function under certain circumstances also as one antenna.

Appropriately, every receiver part (shown in FIG. 5 as a dashed line) comprises a transmitting antenna (76) and a signal processing device (77). Also here can the transmitting antenna (76) be combined with the receiver antenna (60).

The functioning of this embodiment is now described in the following:

While in the above described embodiment measurements are carried out in predetermined time intervals, here pressure measurement is triggered by the receiving device. The microprocessor (66) of the receiving device operates such that an appropriate signal is generated and is emitted by the antenna (76). The microprocessor of the transmitting device is always to be found in stand-by-mode. As soon as a signal is received by way of the receiver antenna (30) and the signal processing circuit (29), a measurement is carried out and the result is emitted from the antenna (26).

With this embodiment, the central receiving device can probe one after the other the individual emitting devices.

The remaining aspects of it's functioning is the same as the embodiment described above. The pairing mode is preferably established somewhat differently because now the receiving device can actively operate the emission of the transmission signals. In this case, the receiving device, as soon as it is switched to the pairing mode, will probe one after the other the transmitting devices which are to be found in the vehicle and will take-up and store the corresponding identification signal. As such, the pairing relationship can be carried out by way of the signal intensity, or, here it is particularly favourable to carry out the pairing relationship by way of a result which has been caused from outside, for example, a known manual reduction in the pressure of a respective related wheel.

With the embodiment according to FIGS. 1 to 5, the current supply to the receiver is provided by way of the motor vehicle battery. Should the situation arise, an additional battery to secure the contents of the memory can be provided.

Figure 6:
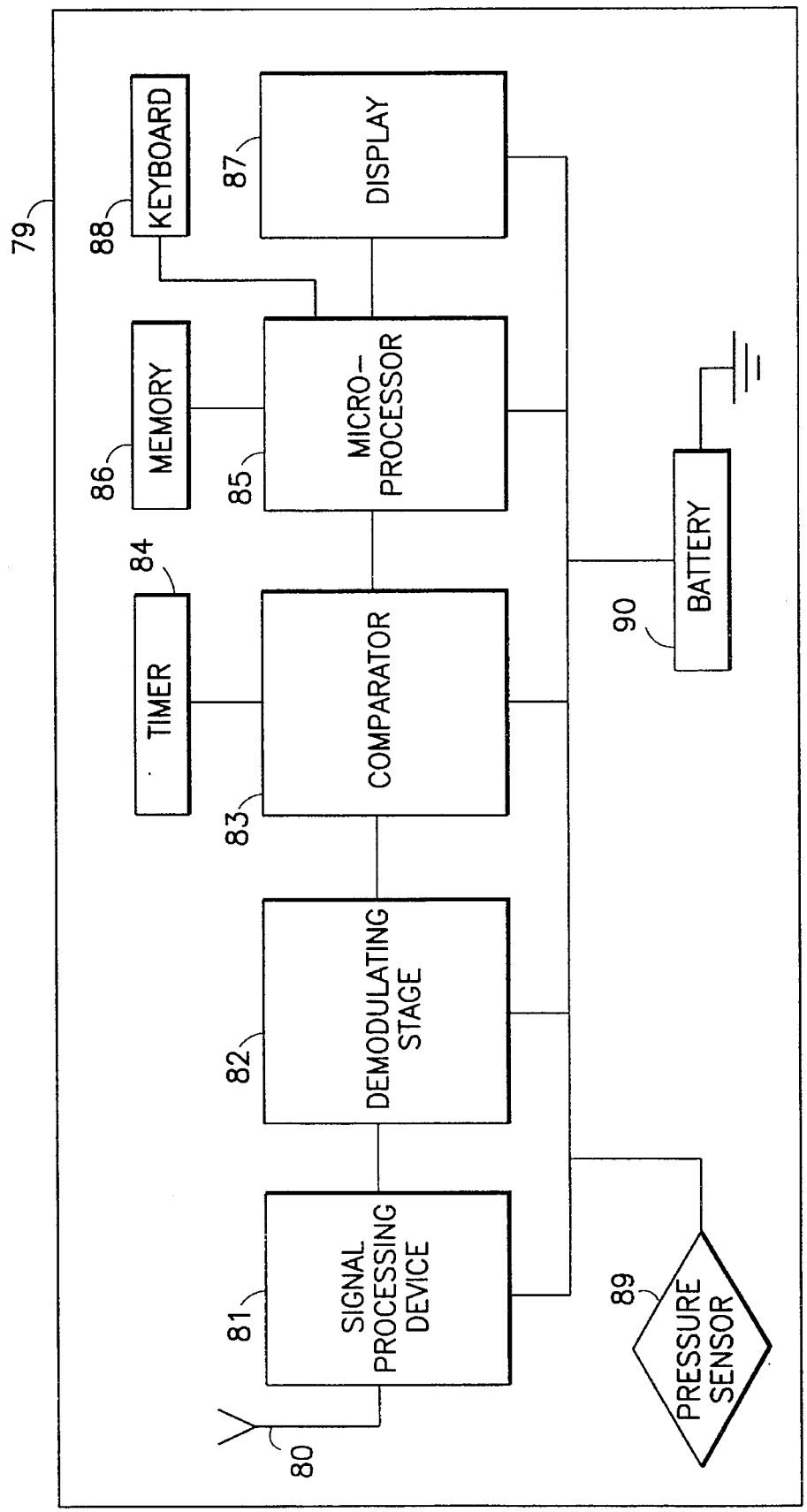
FIG. 6. A schematic block diagram of the receiving device according to a further embodiment of the invention.

A third embodiment of the invention will now be described with reference to FIG. 6.

With this monitoring device, the same transmitting device is used on each wheel, as has been discussed in reference to the modified embodiment (shown by the dashed line) of FIG. 2, that is, transmitting devices which comprise of an additional receiver antenna.

The receiving device in accordance with this third embodiment is fully accommodated in a transportable housing (79), preferably a plastic housing. The receiving device comprises of a single antenna (80) whose signal is received and amplified by a signal processing device (81) and which is demodulated in a demodulating stage (82) and conveyed to the microprocessor (85) by way of a comparator 83. The timing of the device is carried out by an interval-timer (84). The programme to control the microprocessor (85) as well as the required data is contained in a memory (86). The output signals of the microprocessor can be shown on the display device (87). Furthermore, a switch or a keybeard (88) is provided through which the user can transmit instructions to the receiving device. To measure the pressure inside of the house which corresponds to the surrounding pressure, a pressure sensor (89) is provided. The current supply to the whole device is provided by means of a battery (90) which is also accommodated in the housing.

The functioning of this device is now described in the following:

The device is intended to operate in the stationary mode, that is, in order to measure the pressure before the start of travel or during a travel stop. With this device, the power of operation proceeds from wheel to wheel and respectively activates a corresponding switch of the switching device. As a result, a signal is output from the receiving device. How this is managed has already been explained in reference to the second embodiment. This signal triggers the transmitting device of the wheel, which is to be found in the transmitting region of the receiving device, to carry out a measurement and to transmit the measurement signal. The receiving device checks the identification signal, and if the comparison was positive writes the measured pressure value in the memory (86) together with the associated wheel position and as well, shows this value on the display device (87). In particular, for lorries, the measurement can be simplified and acceralated if a random controller is provided in the transmitting device which allows the transmitting device to send a randomly independent time delay. Therefore, it is possible to record practically at the same time, and also collision free the measurement results from two or more wheels, which results can then be displayed.

In particular, according to this embodiment, if for lorries the switched device is installed, it is advisable to further modify the device such that not only are the actual measurement values and the associated tire positions displayed, but as well that the received values, date and time, can also be stored for a long period of time. In this way, it is possible to check if the above-mentioned pressure measurements are being regularly carried out. Furthermore, it is also possible after an accident to tell when the tire pressure in the different wheels were last measured and how high the respective pressure was.

Here, the pairing must be manually carried out for each wheel because otherwise the wheel position is not determined. For carrying out pairing, the receiving device is arranged close to the respective wheels whose identity of position is typed in by way of the keybeard (88) in the device and is then determined by way of an intensity measurement which is the strongest received signal. Thereafter, the corresponding identification signal which relates to the submitted wheel position is stored. Instead of the intensity measurement, here the pairing can also be confirmed by means of a defined result, for example, a reduction in pressure in the respective wheel.

Since the receiving device described in the last embodiment also comprised of a transmitter in order to transmit to the transmitting device the start signal for measurement, the pairing in this embodiment, as also with the modified embodiment (dashed line representation) according to FIGS. 1 to 5, can be triggered by a signal.

In this case, the signal transmitted to the transmitting device is so formed that the microprocessor accommodated in the transmitting device can decide if a pressure measurement with it's succeeding pressure signal emission should be carried out, or if a switch over to the pairing mode is desired. After switching over to the pairing mode, then the transmitting device does not send any pressure values, but rather, sends out over a predetermined time interval the identification signal having an additional signal which indicates the pairing mode. The receiver, which is switched as well in the pairing mode, recognises the identification signal and accordingly stores it.

It is also possible, to use the additional antenna and the additional signal processing circuit, as are represented by the dashed line in reference to the embodiment according to FIG. 2, only when the pairing mode is to be initiated. In this case, the antenna and signal processing circuit can be constructed such that the signal received by the antenna is not amplified, but rather must be received with a high enough intensity such that it can be directly conveyed to the microprocessor. The device, which triggers the pairing mode in the transmitting device is, therefore, preferably formed such that the necessary signal intensity to switch over the individual transmitting devices to the pairing mode is just reached, if, the device, which sends out the signal for the pairing mode, and which can be completely separated from the remaining receiver, is held very close to the respective transmitting device, that is, for example, directly on the valve of the tire. As soon as the transmitting device receives this pairing mode signal, it then sends out the identification signal having additional information for the receiving device, which is switched in,the pairing mode, that for this individual transmitting device the pairing mode has been activated.

With this embodiment, the power of operation proceeds along with the activating device, which allows the switching of the respective transmitting devices into the pairing mode, from wheel to wheel and with it, switches the respective wheel into the pairing mode. Through a corresponding activation of a switch at the receiving device or through the keeping of a particular, predetermined sequence, then the respective signals from the receiving device will have a relationship to the individual wheel positions. An activation of this kind can also be triggered by another kind of result. At the transmitting device, a Reed contact can also be provided which is activated by an outside magnet brought close to the tire. Furthermore, it is also conceivable to provide a mechanical activated switching device on the valve stem or valve foot of the tire, which is manually switched or operated through a manually effected side flip movement of the valve.

We claim:

1. A device for monitoring the air pressure in the air chamber of pneumatic tires fitted on vehicle wheels comprising:

a pressure measuring device mounted on a vehicle wheel which measures the air pressure in the air chamber of the wheel end outputs an electrical pressure signal representative of the air pressure in the vehicle wheel;

a transmitter mounted to the vehicle wheel which receives the electrical pressure signal output from the pressure measuring device and sends out a pressure transmitting signal corresponding to said air pressure;

a receiver associated with the transmitter and mounted at a distance to the vehicle wheel which receives the pressure transmitting signal transmitted from the associated transmitters a display device which is connected with the receiver and displays data as numbers or symbols which have been taken from the pressure transmitting signal received from the receiver;

wherein the transmitter comprises an emitter-control device which controls the emittance of the pressure transmitting signal and a signal-generating device which generates an identification signal which is unique for the transmitter and clearly identifies same;

the emitter-control device works such that the identification signal is transmitted at least once before or after the emittance of the pressure transmitting signal;

the receiver comprises at least a memory in which is stored an identification reference signal related to the associated transmitter in accordance with a predetermined relationship criteria;

the receiver comprises a comparison device which checks if an identification signal transmitted from a transmitter has the relationship criteria to identification reference signal stored in the receiver, and that further processing of the pressure transmission signal taken from the receiver only takes places if the identification signal received by the receiver and the identification reference signal stored in the receiver fulfill the relationship criteria;

the identification reference signal stored in the receiver is changeable in order that the identification signal from the associated transmitter matches the identification reference signal of the receiver; and the receiver is connected with a switching device which enables the receiver to switch over from normal operating mode, in which the air pressure is monitored, to pairing mode, in which the receiver collects the identification signal of the transmitter and stores this as an identification signal.

2. A monitoring device according to claim 1, additionally comprising a converter device which converts and digitally codes the signals transmitted from the transmitter.

3. A monitoring device according to claim 1 wherein at least the emitter-control device and the signal-generating device of the transmitter are combined in a first microprocessor device which is controlled by a program stored in a memory.

4. A monitoring device according to claim 1 wherein a signal amplifier and filter device, the comparison device and the memory for storing the identification reference signal of the receiver are contained in an integrated chip.

5. A monitoring device according to claim 2 wherein the identification signal in the transmitter is stored as a digital sequence having n bits and that the identification reference signal in the associated receiver is also stored as a digital sequence having n bits.

6. A monitoring device according to claim 2 wherein transmission of the signals from the transmitter to the receiver is carried out with electromagnetic waves of constant frequency acting as carrier waves.

7. A monitoring device according to claim 6 wherein the frequency of the electromagnetic carrier waves lie in the wavelength region between 4 and 8 kHz.

8. A monitoring device according to claim 6 wherein the transmission of the carrier waves is carried out by a change in phase of carrier signal in the form of a sine wave.

9. A monitoring device according to claim 5 wherein every transmission from transmitter to receiver is completed with a transmission of at least a 4 bit sequence having a respective predetermined bit-count whereby the first bit sequence is a preamble, which enables the synchronization of the receiver with the transmitter, the second, or third bit sequence is a data sequence which represents the measured pressure signal and respectively contains the identification signal, and a fourth and final bit sequence as a post-amble.

10. A monitoring device according to claim 1 wherein the transmitter comprises a timer device and is controlled in such a way that the pressure measuring device measures pressure in predetermined, significantly constant time intervals.

11. A monitoring device according to claim 10 wherein the electrical pressure signal representative of the pressure measurement is converted to a transmitting signal and is sent before a next pressure measurement is carried out, and a random circuit is provided which allows the time interval between the pressure measurement and emittance of the measured pressure signal to be randomly independent.

12. A monitoring device according to claim 1 wherein the transmitter comprises a detector device which recognizes a signal emitted from the associated receiver and which, when such a signal occurs, switches the transmitter from a passive stand-by-mode to an active send-mode so that a pressure measurement is carried out and a pressure transmitting signal is emitted.

13. A device according to claim 1 wherein a pressure measuring device and a transmitter are provided on at least two of the wheels of a vehicle.

14. A monitoring device according to claim 13 wherein a receiver is associated with every pressure measurement device and transmitter fixed to a wheel of the vehicle whereby the signals received by each receiver are conveyed to the display device which is a central display device for all receivers.

15. A monitoring device according to claim 13 wherein the receiver is a central receiver which collects the signals from all the transmitters.

16. A monitoring device according to claim 15 wherein the receiver is accommodated in a transportable housing, and a switching device is provided which allows the receiver to emit a signal to an associated transmitting device, recognized by the transmitters fixed to the wheel, to thereby trigger a pressure measurement to be carried out resulting in the pressure measurement being emitted as a signal.

17. A monitoring device according to claim 13 wherein each transmitter comprises a detector device which recognizes emittance of a predetermined switching signal and, therefore, switches the transmitter into a pairing mode in which the identification signal and an additional signal indicating the pairing mode is emitted.

18. A monitoring device according to claim 5 wherein the signal transmitted from the transmitter contains further additional information, which in evaluation of the signal in the receiver, allows recognition of a false transmission as a fault and should the need arise, a correction of this fault.

19. A monitoring device according to claim 1 wherein the identification signal emitted from the transmitter and the identification reference signal stored in the receiver are identical.

20. A monitoring device according to claim 8 wherein the transmission of the carrier waves is carried out by a change in phase of carrier signal in the form of a sine wave is by a differential change in the phase.

21. A monitoring device according to claim 13 wherein the receiver collects identification signals from each transmitter and stores each identification signal as an identification reference signal indicative of the transmitter associated with a particular vehicle wheel.

* * * * *